United States Patent
Zierden (10) Patent No.: US 10,624,330 B1
(45) Date of Patent: Apr. 21, 2020

(54) ICE FISHING BITE DETECTING AND SIGNALING APPARATUS

(71) Applicant: Dean R. Zierden, Britton, SD (US)

(72) Inventor: Dean R. Zierden, Britton, SD (US)

(*) Notice: Subject to any disclaimer, the term of this patent is extended or adjusted under 35 U.S.C. 154(b) by 186 days.

(21) Appl. No.: 15/879,926

(22) Filed: Jan. 25, 2018

(51) Int. Cl.
*A01K 97/12* (2006.01)
*A01K 97/01* (2006.01)

(52) U.S. Cl.
CPC .......... *A01K 97/125* (2013.01); *A01K 97/01* (2013.01)

(58) Field of Classification Search
CPC ....... A01K 97/125; A01K 97/01; A01K 97/12
USPC ...................................... 43/16, 17
See application file for complete search history.

(56) References Cited

U.S. PATENT DOCUMENTS

| | | | | |
|---|---|---|---|---|
| 2,663,110 A * | 12/1953 | Guzy | ................ | A01K 97/125 43/17 |
| 3,798,630 A * | 3/1974 | Crosthwait | .......... | A01K 97/125 43/17 |
| 4,246,716 A * | 1/1981 | Elmer | ................ | A01K 97/01 43/17 |
| 4,520,586 A | 6/1985 | Moisan | | |
| 4,727,673 A * | 3/1988 | Dumar | ................ | A01K 97/01 362/191 |
| 4,862,627 A | 9/1989 | Keller | | |
| 4,901,468 A * | 2/1990 | Blackledge | ............ | A01K 93/02 43/17 |
| 4,934,090 A * | 6/1990 | Storey | ................ | A01K 97/01 43/16 |
| 4,945,668 A | 8/1990 | Keller | | |
| 5,067,269 A | 11/1991 | Eppley | | |
| 6,012,247 A * | 1/2000 | Kinsey | ................ | A01K 91/10 43/15 |
| 6,389,734 B1 | 5/2002 | Niles | | |
| 7,008,086 B1 | 3/2006 | Kell | | |
| 7,032,343 B1 | 4/2006 | Foss | | |
| 7,343,708 B2 * | 3/2008 | Pieczynski | ............ | A01K 97/01 43/17 |
| 7,818,913 B1 * | 10/2010 | Hoglund | ............... | A01K 97/01 43/16 |
| 7,946,076 B2 | 5/2011 | Gascoigne | | |
| 8,497,778 B1 | 7/2013 | Martin | | |
| 8,701,333 B2 * | 4/2014 | Christianson | .......... | A01K 97/01 43/16 |
| 8,756,854 B1 | 6/2014 | Michaels | | |
| 8,978,288 B2 | 3/2015 | Olson | | |
| 9,095,130 B2 | 8/2015 | Coulson | | |

(Continued)

*Primary Examiner* — Darren W Ark
*Assistant Examiner* — Katelyn T Truong
(74) *Attorney, Agent, or Firm* — Jeffrey A. Proehl; Woods, Fuller, Shultz & Smith, PC (57) ABSTRACT

An apparatus for detecting and signaling a disturbance of fishing gear while ice fishing may include an elongated base for positioning above an ice fishing hole, with a channel having opposing sides being located on the base for receiving a portion of the bobber, and a disturbance detecting assembly for detecting a disturbance of the fishing gear when a fish engages with the fishing gear. The detecting assembly may comprise a movable flap for releasably holding the portion of the bobber in the channel, and a detection switch in communication with the flap such that movement of the flap in at least one direction causes the detection switch to be actuated. The apparatus may also include an alerting assembly for signaling that the disturbance detecting assembly has detected a disturbance of the fishing gear.

16 Claims, 5 Drawing Sheets

(56) References Cited

U.S. PATENT DOCUMENTS 9,179,658 B2 11/2015 Galbraith
9,398,764 B2 7/2016 Trout

* cited by examiner

ICE FISHING BITE DETECTING AND SIGNALING APPARATUS

BACKGROUND

Field

The present disclosure relates to fish bite indicating devices and more particularly pertains to a new ice fishing bite detecting and signaling apparatus for facilitating notification of the fisherman of a possible bite on the fishing line.

SUMMARY

In one aspect, the present disclosure relates to an apparatus for detecting and signaling a disturbance of fishing gear by a fish while ice fishing. The fishing gear may include a fishing line with a length having a hook at one end of the length and a bobber at a position along the length of the fishing line. The apparatus may comprise a base for positioning above an ice fishing hole, and may be elongated to bridge across the opening of the ice fishing hole.

The apparatus may also include a channel with opposing sides located on the base for receiving a portion of the bobber, a power source associated with the base, and a power switch associated with the base and in electrical communication with the power source and configured to selectively provide and interrupt power from the power source. The apparatus may also include a disturbance detecting assembly for detecting a disturbance of the fishing gear when a fish engages with the fishing gear. The detecting assembly may comprise a flap for releasably holding the portion of the bobber in the channel, with the flap being movable with respect to the channel between a set condition and a released condition. The set condition may be characterized by the portion of the bobber being positioned between the flap and one of the sides of the channel, and the released condition being characterized by the flap being positioned against one of the sides of the channel without any portion of the bobber positioned therebetween. The disturbance detecting assembly may also comprise a detection switch in communication with the flap such that movement of the flap in at least one direction causes the detection switch to be actuated, with the switch being configured with respect to the flap such that the detection switch closes when the flap is in the released condition and the detection switch opens when the flap is in the set condition. The apparatus may also include an alerting assembly for signaling that the disturbance detecting assembly has detected a disturbance of the fishing gear. The disturbance detecting assembly and the alerting assembly may form a circuit to produce an alert when the portion of the bobber is removed from the channel of the base and the flap moves from the set condition to the released condition to alert a user of the apparatus to check the fishing gear.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 5 thereof, a new ice fishing bite detecting and signaling apparatus embodying the principles and concepts of the disclosed subject matter will be described.

In one aspect, the disclosure relates to an apparatus 10 useful for detecting and signaling a disturbance of fishing gear 1 by a fish while fishing, such as during ice fishing conducted through a hole made in the ice formed over a body of water. The fishing gear 1 may typically include a fishing line 2 with a length having a hook 3 secured to one end of the length of line. The fishing gear 1 may also include a bobber 4, sometimes referred to more formally as a fishing float, attached to the fishing line at a medial or intermediate position along the length of the fishing line and generally toward the end having the hook mounted thereon. The bobber 4 may have a bulbous body 5 and an upper shaft 6 which generally extends upwardly from the body 5, and may also have a lower shaft 7 which extends generally downwardly from the body along the same axis as the upper shaft 6.

The apparatus 10 may include a base 12 for positioning above an ice fishing hole 8, and in some usages the base 12 may rest upon and bridge across edges of the ice located on opposite sides of the opening of the hole 8. The elongated base 12 may have opposite ends 14, 15, and may also have an upper surface 16 for orienting in a generally upward direction and a lower surface 17 for orienting in a generally downward direction, and the surfaces 16, 17 may extend between the opposite ends 14, 15. The base 12 may also have opposite side surfaces 18, 19 which extend between the upper 16 and lower 17 surfaces as well as between the opposite ends 14, 15. It will be appreciated that other configurations for the base may also be employed.

A channel 20 may be located on the base 12 for receiving an element of the fishing gear, such as a portion of the bobber 4. In some implementations, the portion of the bobber 4 positioned (or positionable) in the channel is the upper shaft 6 of the bobber, although other portions of the bobber could also be positionable in the channel 20. The channel 20 may be formed into the surface of the base 12, and may extend from the lower surface 17 toward the upper surface 16, and may also extend from a first one 18 of the side surfaces toward a second one 19 of the side surfaces of the base. In some embodiments, the channel extends from the lower 17 to the upper surface 18 of the base. In some embodiments, the channel may be substantially U-shaped with opposing sides 22, 23 which may be oriented substantially parallel to each other. The channel 20 may have a blind end 24 and an open end 26, with the open end being located at one 18 of the side surfaces of the base.

The apparatus 10 may also include a disturbance detecting assembly 30 for detecting a disturbance of the fishing gear, such as the bobber, when a fish engages or contacts the fishing gear, such as the hook connected by the fishing line to the bobber. The disturbance detecting assembly 30 may comprise a flap 32 for releasably holding the portion of the bobber in the channel 20. The flap 32 may be at least partially located in the channel, and may be biased towards one side 22 of the channel. The flap 32 may be movable with respect to the channel between a set condition (see FIG. 3B) and a released condition (see FIG. 3A). The movable portion of the flap may have a contacting surface 33 which faces one of the sides 22 of the channel. The set condition of the flap may be characterized by the portion of the bobber being positioned between the flap 32 (and the contacting surface 33 thereon) and the side 22 of the channel opposite of the contacting surface, and the portion of the bobber may effectively be pinched between the flap and channel side 22. The release condition of the flap may be characterized by the flap being positioned against one of the sides of the channel without any portion of the bobber being positioned therebetween.

The flap 32 may be flexible, and may be resiliently flexible, and accordingly may be formed of a resiliently flexible material. The flap may have a free end 34 and the fixed end 35, with the fixed end being fixed to the base 12 and the free end being free of connection to the base (e.g. other than the connection to the base through the fixed end). The free end 34 may be located in the channel toward the blind end 24, and the fixed end may be located toward the open end 26 of the channel. In some embodiments, the fixed end 35 may be located outside of the channel, and may be fixed to the side surface 18 of the base. The flap 32 may have a pivoting bend 36 which is located between the fixed 35 and free 34 ends of the flap, and the pivoting bend may be located at or close to the open end 26 of the channel.

The disturbance detecting assembly 30 may also include a detection switch 38 which is in communication with the flap 32 such that movement of the flap in at least one direction causes the detection switch 38 to be actuated. The detection switch may be positioned with respect to the flap such that the detection switch closes when the flap is in the released condition and the detection switch opens when the flap is in the set condition. The detection switch 38 may press the flap against the portion of the bobber and press the bobber against one of the sides of the channel to effectively hold the portion in the channel and the bobber on the base in a generally suspended condition. The detection switch 38 may comprise a microswitch, and the microswitch may have a normally closed condition but be held in an open condition by the presence of the portion of the bobber in the channel which tends to move the flap away from the side 22 of the channel toward the side 23. An illustrative microswitch includes an actuating arm and a rotatable roller mounted on the free end of the actuating arm that contacts the flap. Other suitable switches may also be utilized.

The apparatus 10 may also include a power source 40 which may be mounted on the base 12 for providing electrical power to the various elements of the apparatus. The power source 40 may include a replaceable battery assembly 42 which may comprise a battery holder 44 mounted on the base and may be configured to removably receive at least one battery, and may also include at least one battery 46 which is removably mounted on the battery holder 44. Optionally, the power source 40 may include a rechargeable battery which is mounted on the base and may not require a replaceable battery holder. The apparatus 10 may also include a power switch 48 which is in electrical communication with the power source and may be configured to selectively provide and cut off power from the power source to, for example, the disturbance detecting assembly 30 and the alerting assembly 50.

The alerting assembly 50 of the apparatus may be provided for signaling that the disturbance detecting assembly 30 has detected a disturbance of the fishing gear, such as the bobber 4, caused by a fish disturbing the hook 3 of the fishing gear 1. The alerting assembly 50 may include an alert element 52 which is configured to produce an alert perceptible to the senses of a person located in the vicinity of the apparatus 10. The alert elements may comprise a visual alert device 54 which is configured to produce a visually perceptible alert, such as a light emitting device or bulb. The alert element 52 may also include an audible alert device 56 which is configured to produce an audibly perceptible alert, such as a buzzer or speaker or other sound producing device.

The disturbance detecting assembly 30 and the alerting assembly 50 may form a circuit to produce an alert when the portion of the bobber is removed from the channel of the base and the flap moves from the set condition to the release condition to alert the user of the apparatus to check the condition of the fishing gear for a possible fish bite.

Figure 1:
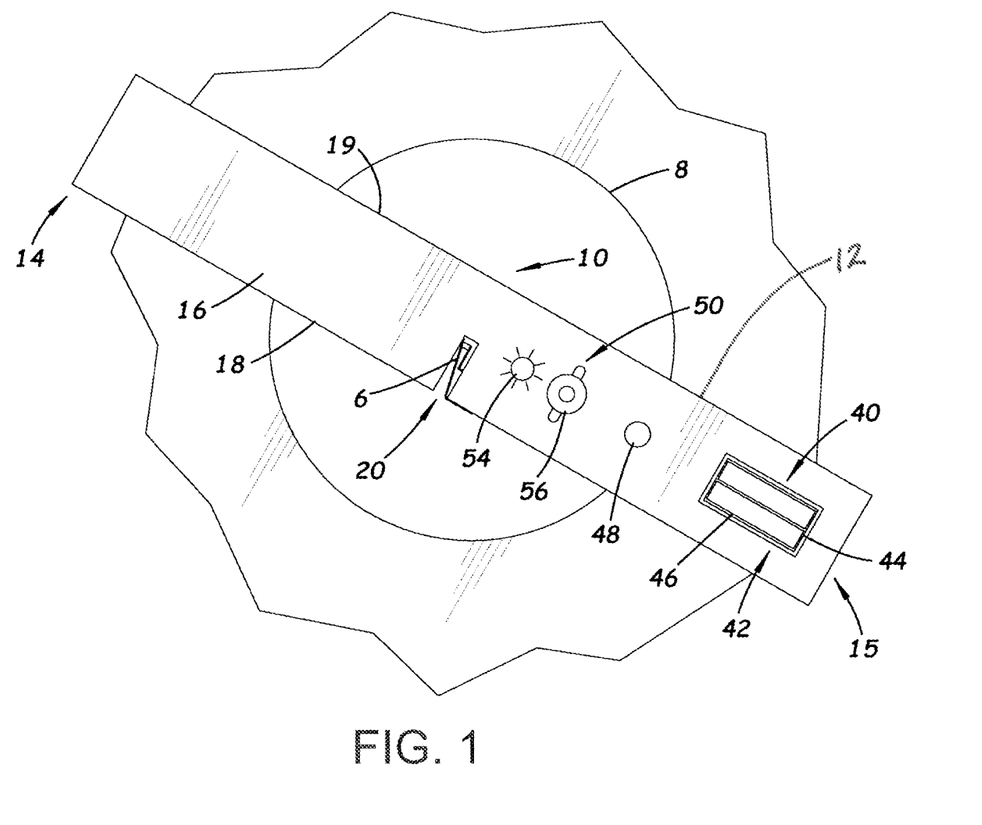
FIG. 1 is a schematic perspective view of a new ice fishing bite detecting and signaling apparatus according to the present disclosure.
Figure 2:
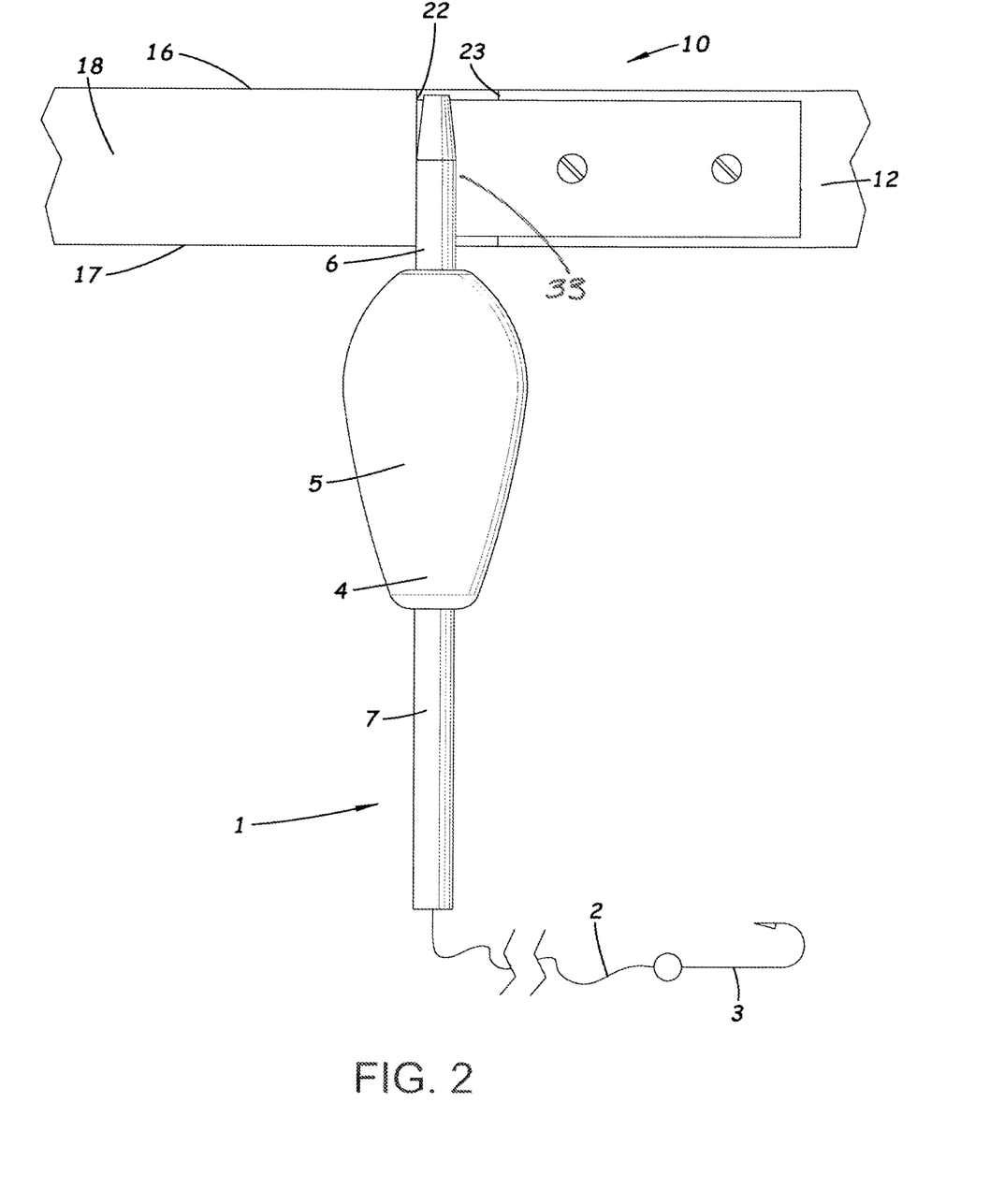
FIG. 2 is a schematic side view of the apparatus, according to an illustrative embodiment.
Figure 3A:
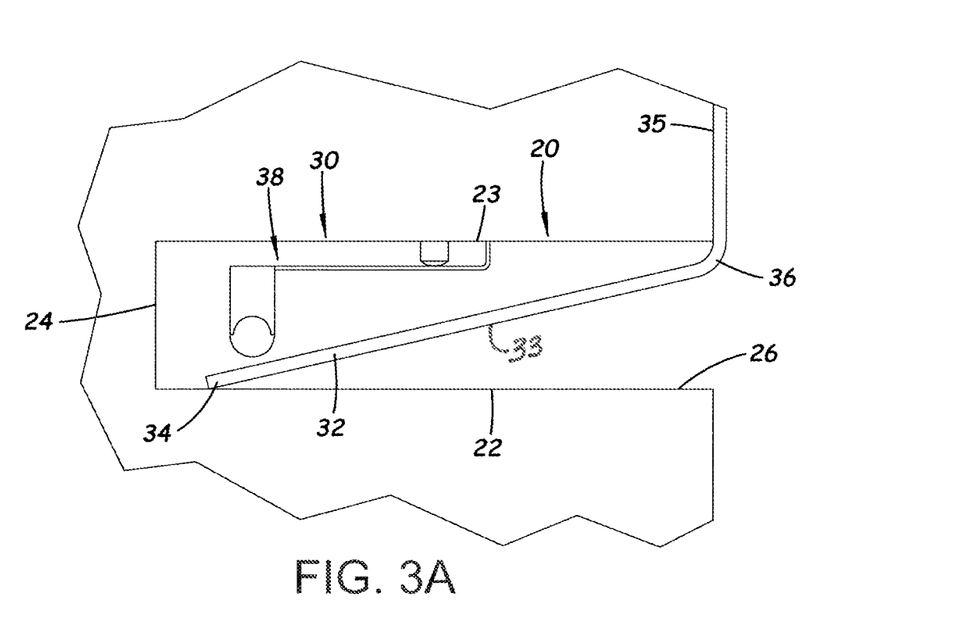
FIG. 3A is a schematic top view of the apparatus showing the flap in the released condition, according to an illustrative embodiment.
Figure 3B:
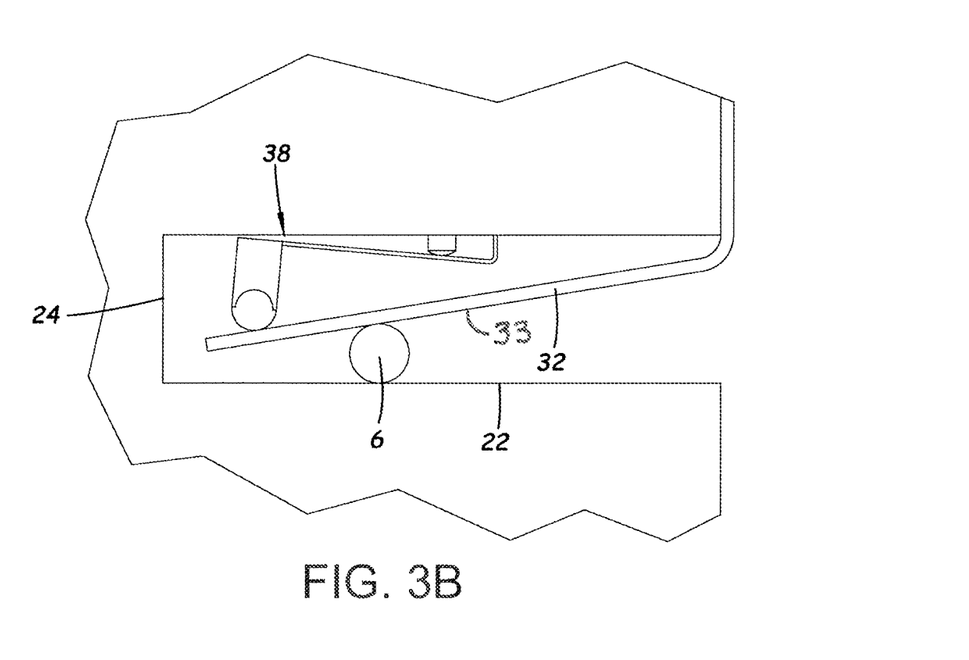
FIG. 3B is a schematic top view of the apparatus showing the flap in the set condition, according to an illustrative embodiment.
Figure 4:
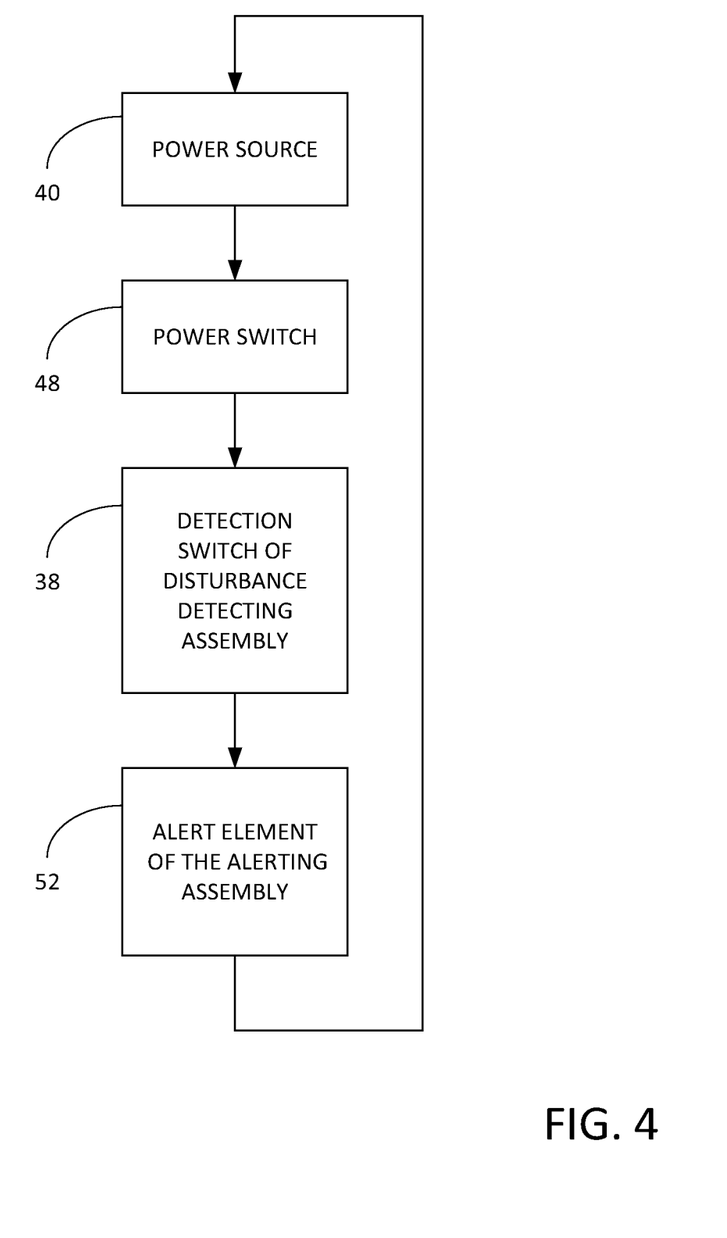
FIG. 4 is a schematic diagram of elements of the apparatus, according to an illustrative embodiment.
Figure 5:
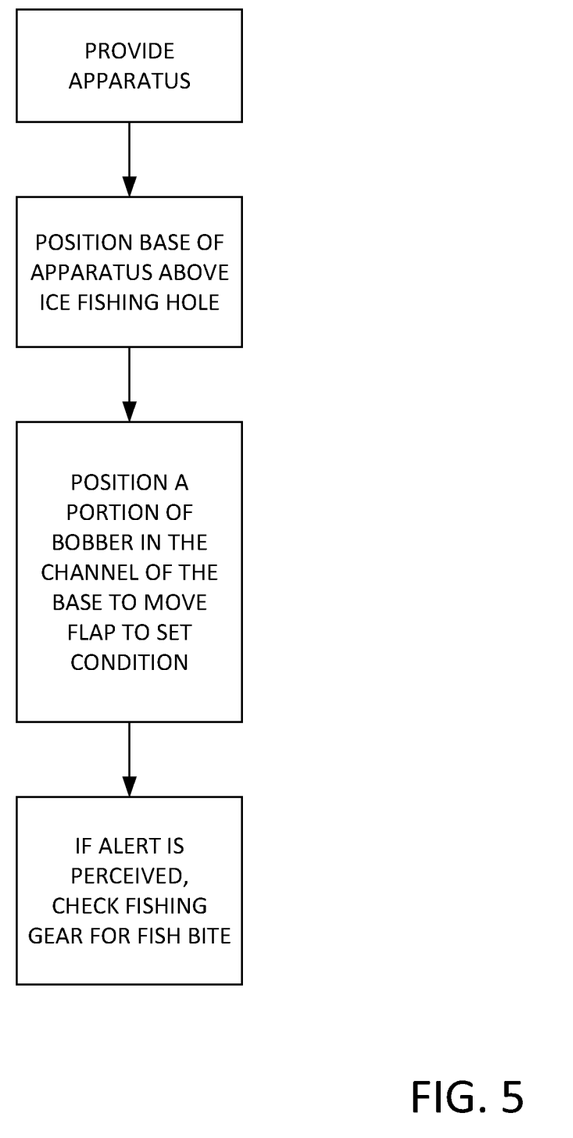
FIG. 5 is a schematic flow diagram of an illustrative implementation of a method of employing the apparatus.

In another aspect, the disclosure relates to a method of detecting and signaling a disturbance of fishing gear by a fish while ice fishing. The method may include, for example, providing an apparatus having at least some of the features of the apparatus 10 set forth in this disclosure. The method may further include positioning the base 12 of the apparatus above an ice fishing hole, and may include bridging the base across the opening of the whole between the edges of the ice. The method may further include positioning a portion of the bobber, such as the upper shaft 6 of the bobber, in the channel 20 formed in the base in a manner that moves the flap 32 of the disturbance detecting assembly 30 from the released condition to the set condition to thereby open the detection switch 38 and open the circuit. At this point, the power switch 48 may be moved from a "power off" condition to a "power on" condition if this has not already been done.

The fishing line 2 attached to the bobber 4 with the hook 3 may be positioned in the water adjacent to the opening in the case. Movement in the fishing gear may result in the fishing line, and the bobber attached to the fishing line, being pulled downwardly toward the opening of the hole and removing the portion of the bobber from the channel, which disengages the bobber from the flap to allow the flap to move from the set condition to the release condition. Correspondingly, the detection switch 38 changes from an open condition to a closed condition, completing the circuit and causing the alerting assembly 50 to be energized so that the alert element 52 provides a visual and or audible alert. If an alert from the alerting assembly 50 is perceived, either visually or audibly, then the user may be triggered to check the fishing gear for a possible fish bite on the fishing hook.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An apparatus for detecting and signaling a disturbance of fishing gear by a fish while ice fishing, the fishing gear including a fishing line with a length having a hook at one end of the length and a bobber at a position along the length of the fishing line, the apparatus comprising:

an elongated base for positioning above an ice fishing hole, the base having an upper surface and a lower surface;

a channel with opposing sides located in the base for receiving a portion of the bobber;

a power source associated with the base;

a power switch associated with the base and in electrical communication with the power source and configured to selectively provide and interrupt power from the power source;

a disturbance detecting assembly for detecting a disturbance of the fishing gear when a fish engages with the fishing gear, the detecting assembly comprising:

a flap for releasably holding the portion of the bobber in the channel, the flap being movable with respect to the channel between a set condition and a released condition, the set condition being characterized by the portion of the bobber being positioned between the flap and one of the sides of the channel, the released condition being characterized by the flap being positioned against one of the sides of the channel without any portion of the bobber positioned therebetween;

a detection switch in communication with the flap such that movement of the flap in at least one direction causes the detection switch to be actuated, the detection switch being configured with respect to the flap such that the detection switch closes when the flap is in the released condition and the detection switch opens when the flap is in the set condition;

an alerting assembly for signaling that the disturbance detecting assembly has detected a disturbance of the fishing gear;

wherein the disturbance detecting assembly and the alerting assembly form a circuit to produce an alert when the portion of the bobber is removed from the channel of the base and the flap moves from the set condition to the released condition to alert a user of the apparatus to check the fishing gear;

wherein the channel is open in an upward direction through the upper surface and in a downward direction through the lower surface to permit a bobber to extend upwardly and downwardly from the channel;

wherein the elongated base has opposite ends, the upper surface and the lower surface extending between the ends, and opposite side surfaces;

wherein the channel extends from the lower surface of the base toward the upper surface, and extends from one side surface of the base toward the other side surface; and wherein the channel is substantially U-shaped with a blind end and an open end, the open end being located at one of the side surfaces of the base.

2. The apparatus of claim 1 wherein the alerting assembly comprises an alert element configured to produce a perceptible alert to a person adjacent to the apparatus.

3. The apparatus of claim 2 wherein the alert element comprises a visual alert device configured to produce a visually perceptible alert.

4. The apparatus of claim 2 wherein the alert element comprises an audible alert device configured to produce an audibly perceptible alert.

5. The apparatus of claim 1 wherein the flap is at least partially located in the channel of the base.

6. The apparatus of claim 5 wherein the flap is biased toward one side of the channel.

7. The apparatus of claim 5 wherein the flap has a free end and a fixed end, the fixed end being fixed to the base and the free end being free of connection to the base.

8. The apparatus of claim 7 wherein the free end of the flap is located in the channel toward the blind end of the channel, the fixed end being located toward the open end of the channel, the fixed end being located outside of the channel.

9. The apparatus of claim 8 wherein the flap has a pivoting bend located between the fixed and free ends.

10. The apparatus of claim 9 wherein the pivoting bend is located at the open end of the channel.

11. The apparatus of claim 1 wherein the flap is resiliently flexible.

12. The apparatus of claim 1 wherein the detection switch is configured to press the flap against the portion of the bobber in the channel and press the bobber against one of the sides of the channel.

13. The apparatus of claim 1 wherein the detection switch comprises a microswitch.

14. The apparatus of claim 13 wherein the microswitch has a normally closed condition and is held in an open condition by the presence of the portion of the bobber in the channel.

15. The apparatus of claim 1 wherein the power source comprises a replaceable battery assembly comprising:
a battery holder mounted on the base; and
at least one battery removably mounted on the battery holder.

16. An apparatus for detecting and signaling a disturbance of fishing gear by a fish while ice fishing, the fishing gear including a fishing line with a length having a hook at one end of the length and a bobber at a position along the length of the fishing line, the apparatus comprising:
an elongated base for positioning above an ice fishing hole, the base having an upper surface and a lower surface;
a channel with opposing sides located in the base for receiving a portion of the bobber;
a power source associated with the base;
a power switch associated with the base and in electrical communication with the power source and configured to selectively provide and interrupt power from the power source;
a disturbance detecting assembly for detecting a disturbance of the fishing gear when a fish engages with the fishing gear, the detecting assembly comprising:
a flap for releasably holding the portion of the bobber in the channel, the flap being movable with respect to the channel between a set condition and a released condition, the set condition being characterized by the portion of the bobber being positioned between the flap and one of the sides of the channel, the released condition being characterized by the flap being positioned against one of the sides of the channel without any portion of the bobber positioned therebetween;
a detection switch in communication with the flap such that movement of the flap in at least one direction causes the detection switch to be actuated, the detection switch being configured with respect to the flap such that the detection switch closes when the flap is in the released condition and the detection switch opens when the flap is in the set condition;
an alerting assembly for signaling that the disturbance detecting assembly has detected a disturbance of the fishing gear;
wherein the disturbance detecting assembly and the alerting assembly form a circuit to produce an alert when the portion of the bobber is removed from the channel of the base and the flap moves from the set condition to the released condition to alert a user of the apparatus to check the fishing gear; and
wherein the channel is open in an upward direction through the upper surface and in a downward direction through the lower surface to permit a bobber to extend upwardly and downwardly from the channel;
wherein the alerting assembly comprises an alert element configured to produce a perceptible alert to a person adjacent to the apparatus;
wherein the alert element comprises a visual alert device configured to produce a visually perceptible alert;
wherein the alert element comprises an audible alert device configured to produce an audibly perceptible alert;
wherein the flap is at least partially located in the channel of the base;
wherein the flap is biased toward one side of the channel;
wherein the flap is resiliently flexible;
wherein the flap has a free end and a fixed end, the fixed end being fixed to the base and the free end being free of connection to the base;
wherein the elongated base has opposite ends, the upper surface and the lower surface extending between the ends, and opposite side surfaces;
wherein the channel is substantially U-shaped with a blind end and an open end, the open end being located at one of the side surfaces of the base;
wherein the free end of the flap is located in the channel toward the blind end of the channel, the fixed end being located toward the open end of the channel, the fixed end being located outside of the channel;
wherein the flap has a pivoting bend located between the fixed and free ends;
wherein the pivoting bend is located at the open end of the channel;
wherein the detection switch is configured to press the flap against the portion of the bobber in the channel and press the bobber against one of the sides of the channel;
wherein the detection switch comprises a microswitch;
wherein the microswitch has a normally closed condition and is held in an open condition by the presence of the portion of the bobber in the channel;
wherein the channel extends from the lower surface of the base toward the upper surface, and extends from one side surface of the base toward the other side surface;
wherein the power source comprises a replaceable battery assembly comprising:
a battery holder mounted on the base; and
at least one battery removably mounted on the battery holder.

* * * * *